(12) United States Patent
Kitamura et al.

(10) Patent No.: US 10,530,224 B2
(45) Date of Patent: Jan. 7, 2020

(54) MOTOR AND ELECTRIC TOOL EQUIPPED WITH THE SAME

(71) Applicant: PANASONIC INTELLECTUAL PROPERTY MANAGEMENT CO., LTD., Osaka (JP)

(72) Inventors: Kota Kitamura, Mie (JP); Hidenori Shimizu, Mie (JP); Atsushi Takeyama, Mie (JP); Motoharu Muto, Mie (JP); Daiju Kinoshita, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 312 days.

(21) Appl. No.: 15/537,818

(22) PCT Filed: Dec. 9, 2015

(86) PCT No.: PCT/JP2015/006122
§ 371 (c)(1),
(2) Date: Jun. 19, 2017

(87) PCT Pub. No.: WO2016/103605
PCT Pub. Date: Jun. 30, 2016

(65) Prior Publication Data
US 2017/0353085 A1 Dec. 7, 2017

(30) Foreign Application Priority Data

Dec. 26, 2014 (JP) ................................. 2014-265185

(51) Int. Cl.
*H02K 11/33* (2016.01)
*H02K 11/21* (2016.01)
*H02K 7/14* (2006.01)

(52) U.S. Cl.
CPC ............... *H02K 11/33* (2016.01); *H02K 7/14* (2013.01); *H02K 11/21* (2016.01)

(58) Field of Classification Search
CPC ............ H02K 3/522; H02K 7/14; H02K 9/22; H02K 11/21; H02K 11/215; H02K 11/33; H02K 2203/12
See application file for complete search history.

(56) References Cited

U.S. PATENT DOCUMENTS 7,973,437 B2 * 7/2011 Feier ................... F16H 61/0006
180/337
2012/0031215 A1 2/2012 Feier
(Continued)

FOREIGN PATENT DOCUMENTS

FR 2998733 B2 1/2000
JP 2011-166857 A 8/2011
(Continued)

OTHER PUBLICATIONS

Partial Supplementary European Search Report, issued in corresponding European Patent Application No. 15872180.3 dated Nov. 30, 2017.
(Continued)

*Primary Examiner* — Ramon M Barrera
(74) *Attorney, Agent, or Firm* — McDermott Will & Emery LLP (57) ABSTRACT

A motor includes: a stator; a rotor axially aligned with the stator; a circuit board; and a heat dissipating plate. The stator includes: an iron core including teeth; an insulator covering one end surface, in the axial direction, of the iron core; and a coil wound around the teeth. The insulator includes an electrically insulating material having a lower rate of heat transfer than a material included in the iron core. The heat dissipating plate is attached to the insulator in a state in which the heat dissipating plate is in contact with the
(Continued)

insulator without being in contact with the iron core, and the circuit board is attached to the heat dissipating plate in a state in which the circuit board is in contact with the heat dissipating plate without being in contact with the iron core.

7 Claims, 5 Drawing Sheets

(56) References Cited

U.S. PATENT DOCUMENTS

2013/0127303 A1  5/2013  Matsumoto
2013/0278094 A1  10/2013  Peterson et al.

FOREIGN PATENT DOCUMENTS

| JP | 2013-031263 A | 2/2013 |
| JP | 2013-093930 A | 5/2013 |
| JP | 2013-110841 A | 6/2013 |
| JP | 2013-243901 A | 12/2013 |

OTHER PUBLICATIONS

Notice of Allowance dated Apr. 29, 2019 for the corresponding European patent application No. 15872180.3.
International Search Report and Written Opinion issued in International Patent Application No. PCT/JP2015/006122, dated Mar. 8, 2016; with partial English translation.

* cited by examiner

MOTOR AND ELECTRIC TOOL EQUIPPED WITH THE SAME

RELATED APPLICATIONS

This application is the U.S. National Phase under 35 U.S.C. § 371 of International Patent Application No. PCT/JP2015/006122, filed on Dec. 9, 2015, which in turn claims the benefit of Japanese Application No. 2014-265185, filed on Dec. 26, 2014, the disclosures of which applications are incorporated by reference herein.

TECHNICAL FIELD

The present invention relates to a motor including a switching element that switches the direction in which the field current flows, and an electric tool including such a motor.

BACKGROUND ART

With electric tools, such as an electric drill or disc grinder, one method of reducing the size of the electric tool is to use a brushless direct current (DC) motor, which does not require electrical connection via a brush or commutator.

Figure 5:
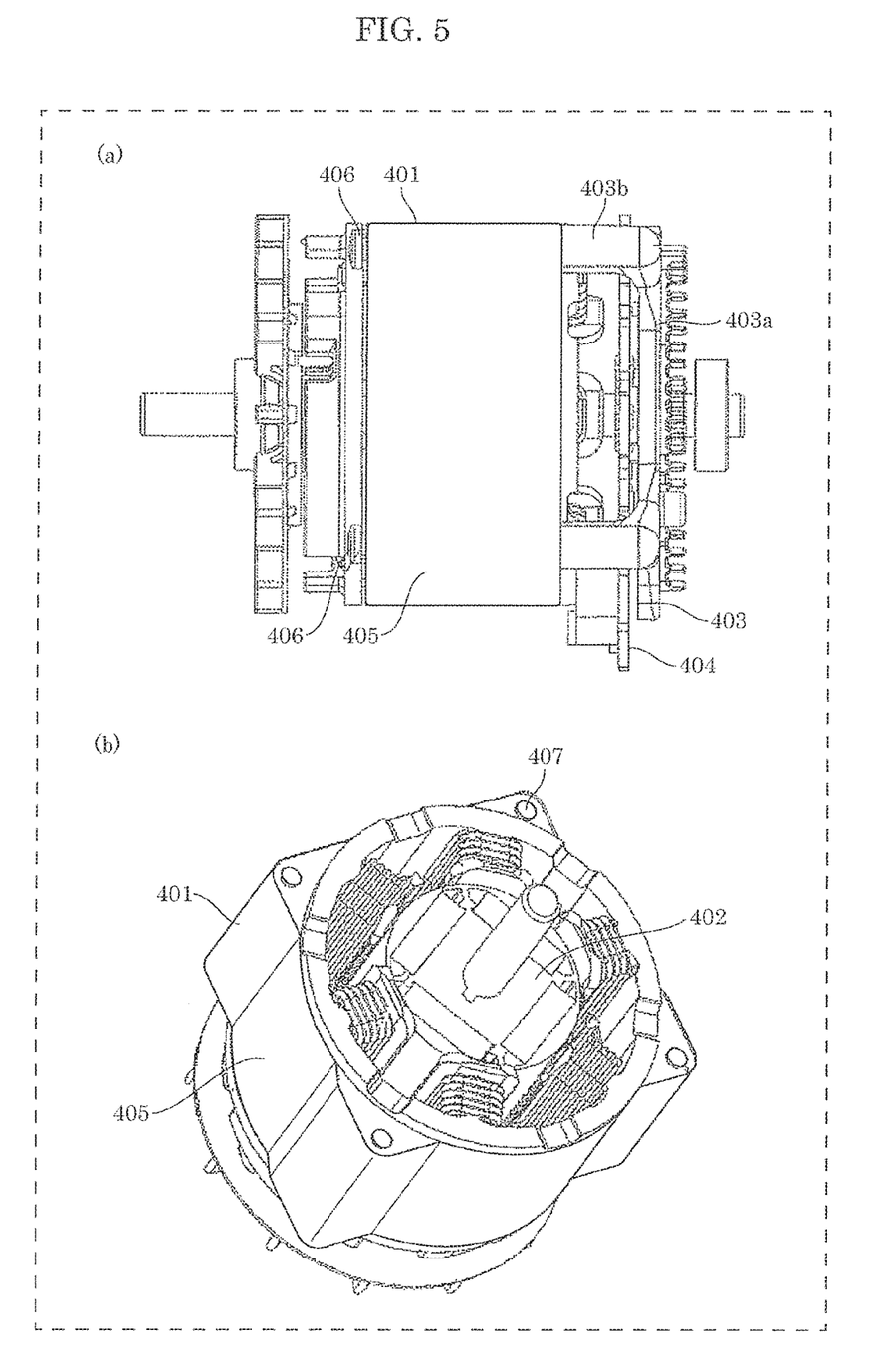
FIG. 5 illustrates a conventional brushless DC motor; (a) is a side view, and (b) is a perspective view in which the circuit board and the heat dissipating plate are omitted.

As illustrated in FIG. 5, a conventional brushless DC motor includes stator 401, rotor 402 axially aligned with stator 401, heat dissipating plate 403 disposed at one end, in the axial direction, of stator 401, and circuit board 404 disposed between stator 401 and heat dissipating plate 403. Stator 401 includes a coil and rotor 402 includes a permanent magnet. Heat dissipating plate 403 includes a plate-shaped main body 403a, and feet 403b. A sensor, such as a Hall element, and a switching element, such as a transistor, are consolidated on circuit board 404.

When such a brushless DC motor is rotationally driven, the rotation angle of rotor 402 relative to stator 401 is measured by the sensor, and the direction in which the field current of the coil flows is switched by the switching element in accordance with the sensor measurement. However, the high switching speed of switching element at high rotational speeds generates a large amount of heat. As a result, dissipating the heat in the switching element on circuit board 404 on which components are consolidated is important. Accordingly, circuit board 404 is attached so as to be in contact with main body 403a of heat dissipating plate 403 to dissipate heat.

Moreover, since the rotation angle of rotor 402 relative to stator 401 is measured using a sensor, the sensor needs to be fixed so as to be stationary relative to stator 401. Accordingly, heat dissipating plate 403 is fixed in place via fixing screws 406 inserted into screw holes 407 in the four corners of iron core 405 such that feet 403b do not contact iron core 405 and move. As a result of feet 403b of heat dissipating plate 403 being fixed to iron core 405, the sensor is fixed so as to be stationary relative to stator 401 via heat dissipating plate 403 and circuit board 404.

CITATION LIST

Patent Literature

PTL 1: Japanese Unexamined Patent Application Publication No. 2013-110841

SUMMARY OF THE INVENTION

Technical Problem

There is a problem with the configuration of PTL 1 illustrated in FIG. 5 in that heat generated in the coil and iron core 405 transfers to heat dissipating plate 403 since feet 403b of heat dissipating plate 403 are in contact with iron core 405.

Typically, in brushless DC motors, more heat is generated in the coil and iron core 405 than in the switching element. Therefore, depending on the driving state, there is concern that heat generated in the coil and iron core 405 will be transferred from heat dissipating plate 403 toward circuit board 404 (hereinafter such heat is referred to as "transferred heat") whereby the heat in the switching element will not be able to be sufficiently dissipated.

The present invention has been conceived in view of the problem described above, and has an object to provide a motor that excels in dissipating the heat in the switching element and has a sensor that can be fixed so as to be stationary relative to the stator, as well as an electric tool including such a motor.

Solution to Problem

In order to achieve the above object, a motor according to one aspect of the present invention includes: a stator; a rotor axially aligned with the stator; a circuit board disposed at one end, in an axial direction, of the stator, and having a sensor for detecting a rotational angle of the rotor and a switching element for controlling a flow of current based on a detection result of the sensor; and a heat dissipating plate disposed at the one end, in the axial direction, of the stator. The stator includes: an iron core including a cylinder and teeth protruding radially inward relative to the cylinder; an insulator covering the teeth and one end surface, in the axial direction, of the cylinder; and a coil wound around the teeth covered by the insulator. The insulator includes an electrically insulating material having a lower rate of heat transfer than a material included in the iron core. The heat dissipating plate is attached to the insulator in a state in which the heat dissipating plate is in contact with the insulator without being in contact with the iron core, and the circuit board is attached to the heat dissipating plate in a state in which the circuit board is in contact with the heat dissipating plate without being in contact with the iron core.

Advantageous Effects of Invention

According to the aspect of the invention described above, since the heat dissipating plate is in contact with and attached to the insulator, which is less thermally conductive than the iron core, without being in contact with the iron core, heat generated in the coil can be inhibited from being transferred from the iron core to the heat dissipating plate. Accordingly, it is possible to inhibit the generation of transferred heat from the heat dissipating plate to the circuit board and thus improve the heat dissipation of the switching element.

Moreover, since the circuit board is attached to the insulator via the heat dissipating plate, the sensor can be fixed to as to be stationary relative to the stator.

Therefore, in a configuration in which the switching element and the sensor are consolidated on the same circuit board, it is possible to both fix the sensor so as to be stationary relative to the stator and improve the heat dissipation of the switching element.

BRIEF DESCRIPTION OF DRAWINGS

In FIG. 2, (a) is a perspective view of an insulator, and (b) is a cross section view taken along line II-II, illustrating the area including a stator.

In FIG. 4, (a) is a cross section view of the motor, and (b) is an enlarged view of the interlocking area of the stator and a housing, in the cross section view of the motor.

DESCRIPTION OF EXEMPLARY EMBODIMENT

The following describes an embodiment of the present invention with reference to the drawings. Note that the embodiment described below shows a specific, preferred example of the present invention. The numerical values, shapes, materials, elements, the arrangement and connection of the elements, etc., indicated in the following embodiment are mere examples, and therefore do not intend to limit the present invention. Therefore, among elements in the following embodiment, those not recited in any of the independent claims defining the most generic part of the inventive concept are described as optional elements.

Moreover, the drawings are schematic drawings and are not necessarily precise depictions. In the drawings, like elements share like reference signs, and as such, duplicate explanation thereof is omitted or simplified.

Embodiment

1. Overall Configuration of Motor

Figure 1:
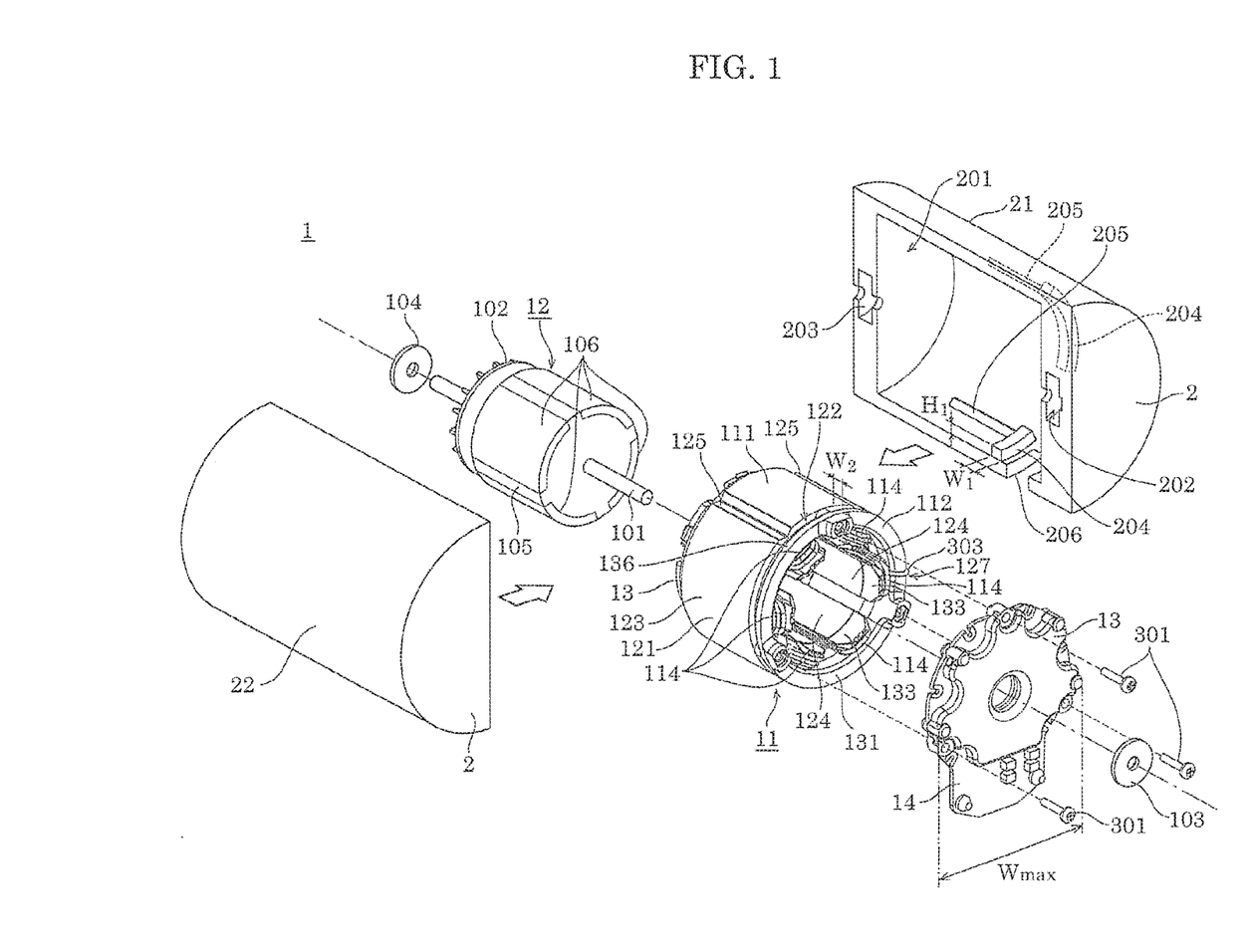
FIG. 1 is an exploded perspective view of a motor according to an embodiment.

First, the overall configuration of motor 1 will be described with reference to FIG. 1. FIG. 1 is an exploded perspective view of motor 1 according to the embodiment. Motor 1 is a brushless DC motor and includes housing 2, stator 11, rotor 12, heat dissipating plate 13, circuit board 14, and bearings 103 and 104. Each element will be described in detail hereinafter.

(1-1. Rotor)

Rotor 12 includes shaft 101, rotor main body 105 that is pressed onto shaft 101 and rotates integrally with shaft 101, and cooling fan 102 that is fixed to shaft 101 so as to be spaced apart from rotor main body 105. Four permanent magnets 106 are embedded in rotor main body 105 at four equal intervals in the circumferential direction.

Rotor 12 is axially aligned with stator 11 and disposed inward of stator 11.

(1-2. Stator)

Stator 11 includes iron core 111, insulators 112 and 113, and coils 114.

Iron core 111 includes the cylindrically shaped cylinder 121 and six teeth 124. The six teeth 134 are disposed on the inner circumference side of cylinder 121 at six equal intervals in the circumferential direction of cylinder 121. Iron core 111 is made of, for example, steel plates stacked in the axial direction. Note that the axial direction refers to a direction parallel to the axis of shaft 101. Four engagement grooves 125 having V-shaped cross sections extend in the axial direction in outer circumferential surface 123 of cylinder 121. Note that the four engagement grooves 125 are provided for positioning stator 11 in the rotational direction upon placing stator 11 in housing 2, and are positioned opposite teeth 124, in locations further outward than teeth 124 in the radial direction.

Insulators 112 and 113, which are made of an insulator such as nylon, are formed so as to be integral with iron core 111 by insert molding, one located at each end surface of iron core 111 in the axial direction. Insulator 112 is less thermally conductive than iron core 111 made of stacked steel plates. A groove-shaped positioning recess 122 that extends in the circumferential direction along the boundary between insulator 112 and iron core 111 is formed in stator 11 by notching a portion of the outer circumferential surface of insulator 112 adjacent to iron core 111 along the circumferential direction. Positioning recess 122 is provided for positioning stator 11 in the axial direction upon placing stator 11 in housing 2.

Figure 4:
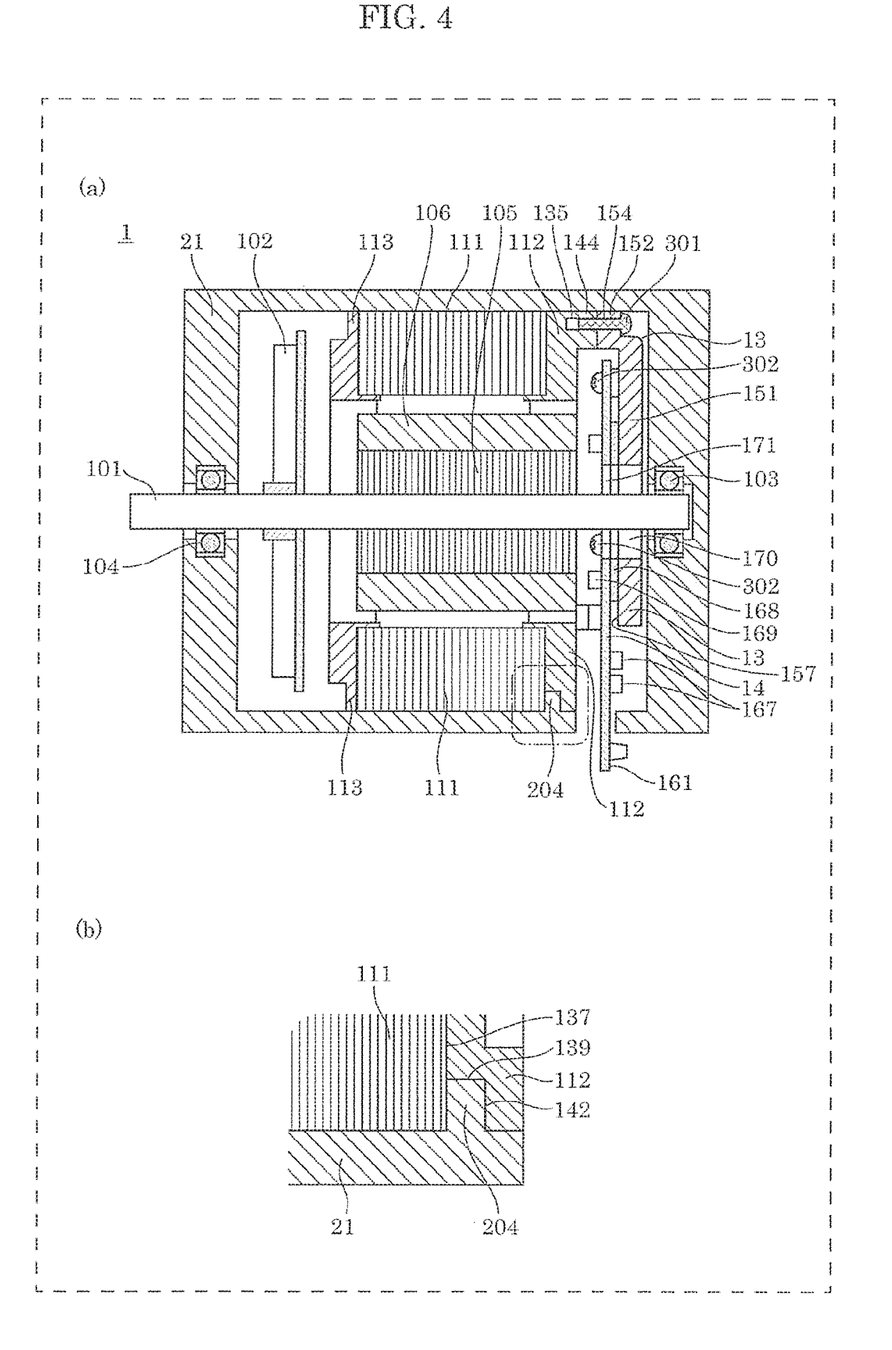

Insulator 112 covers one end surface, in the axial direction, of iron core 111. More specifically, insulator 112 includes annular ring 131 and teeth covers 133. Annular ring 131 has the same outer diameter as cylinder 121 of iron core 111, and covers one end surface, in the axial direction, of cylinder 121. Six teeth covers 133 are provided on the inner circumference side of annular ring 131, and cover the vicinity of one end surface, in the axial direction, of the six teeth 124 of iron core 111. As illustrated in (a) in FIG. 4 (to be described later), similar to insulator 112, insulator 113 covers the other end surface of iron core 111. Coils 114 are realized by wrapping wire around teeth 124 covered by insulator 112 and insulator 113.

Figure 2:
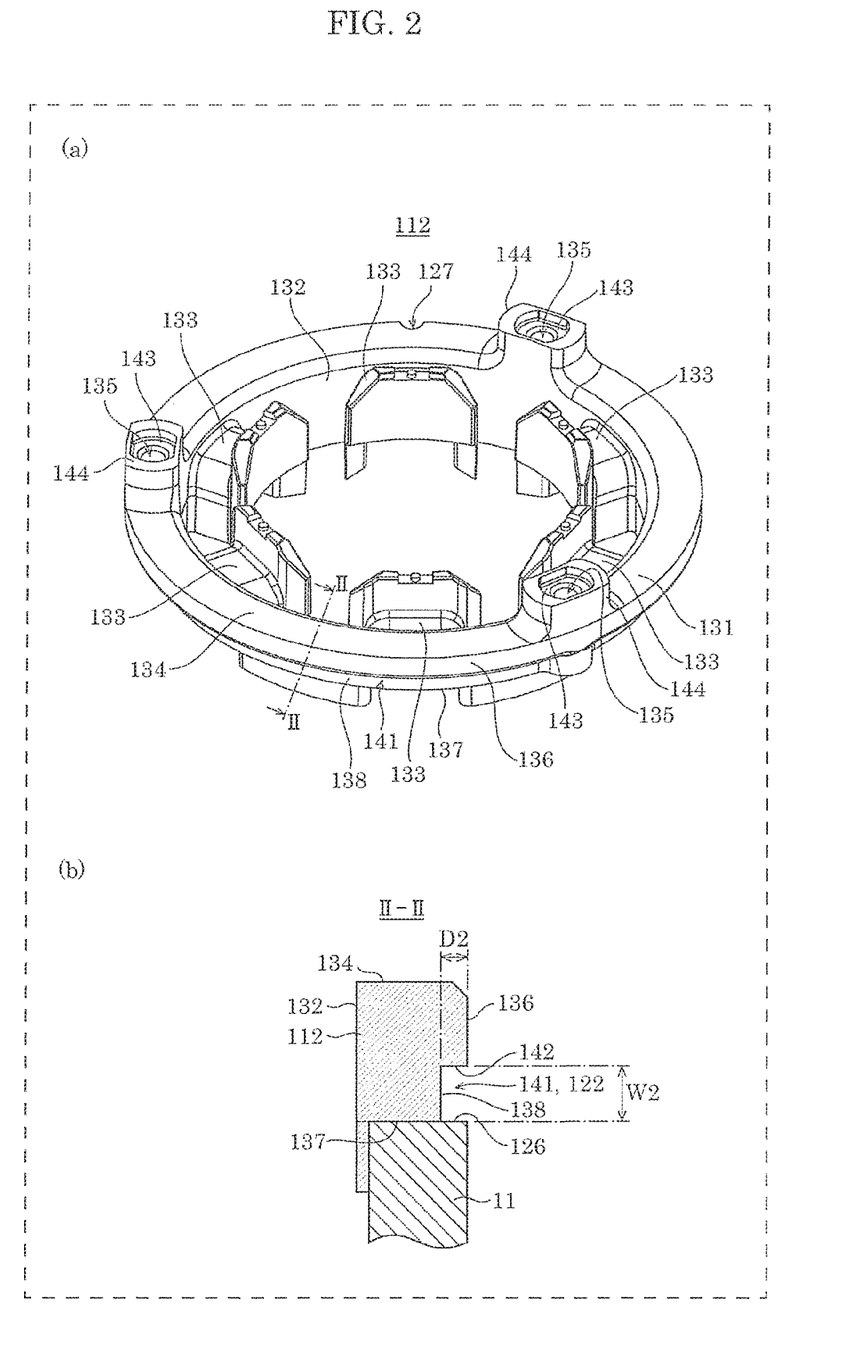

Insulator 112 is illustrated in detail in (a) in FIG. 2. Annular ring 131 of insulator 112 includes inner circumferential surface 132, first surface 134, outer circumferential surface 136, and second surface 137.

Three pedestals 144 are formed on first surface 134, so as to protrude from first surface 134, and are spaced apart at three equal intervals in the circumferential direction. Pedestals 144 are formed between pairs of adjacent teeth covers 133. Accordingly, pedestals 144 do not interfere with the wire upon winding coils 114 around teeth covers 133. Recesses 143 are formed in the top surfaces of pedestals 144, and screw holes 135 are provided in the center of recesses 143.

Second surface 137 is in close contact with the iron core end surface of iron core 111.

Teeth covers 133 are formed protruding radially inward from inner circumferential surface 132 into an upside-down U-shape.

Groove 127 is formed in outer circumferential surface 136. Groove 127 passes through outer circumferential surface 136 in the axial direction from first surface 134 to second surface 137. Groove 127 is positioned opposite a tooth cover 133 such that the tooth cover 133 is located further inward than groove 127.

Notch 141 is also formed in outer circumferential surface 136. Notch 141 extends in the circumferential direction, along the edge bordering second surface 137. In FIG. 2, a cross section of stator 11 taken along line II-II is illustrated in (b). More specifically, notch 141 has a depth D2 from outer circumferential surface 136 of insulator 112 toward the inner circumference side and a width of W2 from second surface 137 toward first surface 134. Notch 141 gives outer circumferential surface 136 a stepped profile whereby second outer circumferential surface 138 and annular end surface 142 are formed. Second outer circumferential surface 138 is smaller in diameter than outer circumferential surface 136, and end surface 142 connects second outer circumferential surface 138 and outer circumferential surface 136 together. With this, in a state in which insulator 112 and iron core 111 are integral, cylinder end surface 126 of iron core 111 and end surface 142 of insulator 112 face one another to form both side surfaces of positioning recess 122. At the same time, second outer circumferential surface 138 forms the bottom surface of positioning recess 122.

As described above, insulator 113 covers the end surface, in the axial direction, of iron core 111, opposite the end that insulator 112 covers. Apart from not including pedestals 144 and not having notch 141, insulator 113 has approximately the same structure as insulator 112.

(1-3. Heat Dissipating Plate)

Heat dissipating plate 13 will be described with reference to FIG. 1. Heat dissipating plate 13 is disposed on the insulator 112 side of stator 11, and is attached to stator 11 via three screws 301. The maximum width Wmax of heat dissipating plate main body 151 (see FIG. 3; to be described later) of heat dissipating plate 13 is smaller than the outer diameter of cylinder 121 of iron core 111, and in a state in which heat dissipating plate main body 151 is attached to stator 11, heat dissipating plate main body 151 does not protrude farther outward than outer circumferential surface 123 of cylinder 121.

Figure 3:
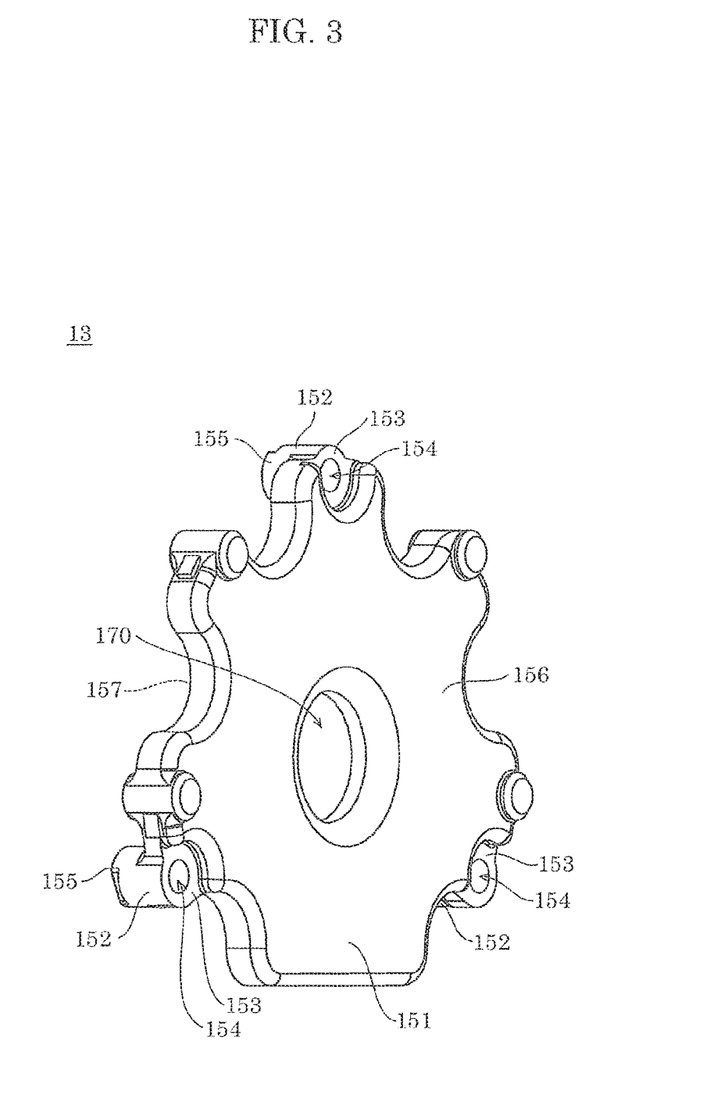
FIG. 3 is a perspective view of a heat dissipating plate.

Heat dissipating plate 13 is illustrated in detail in FIG. 3. Heat dissipating plate 13 is made of a metal having a high rate of heat transfer, such as aluminum, and includes heat dissipating plate main body 151 and feet 152. Bypass port 170 for passing through shaft 101 is formed in the central region of heat dissipating plate main body 151. The outer edge of heat dissipating plate main body 151 protrudes in six locations, the protrusions protruding in a direction away from bypass port 170. Feet 152 are provided on three of the outer edge protrusions of heat dissipating plate main body 151, and extend on the first major surface 157 side of heat dissipating plate main body 151. Feet 152 are substantial circular columns, and leading ends 155 of feet 152 have two segments notched away, one on each of opposing sides of the circle. Upon attaching heat dissipating plate 13 to insulator 112, leading ends 155 are interlocked with recesses 143 formed around screw holes 135 in insulator 112.

Screw head recesses 153 that give the formation location of feet 152 a sunken recessed shape are formed in second major surface 156 of heat dissipating plate 13. Screw holes 154 that pass through feet 152 are formed in screw head recesses 153.

The attachment of heat dissipating plate 13 will be described. In FIG. 4, (a) illustrates a cross section of motor 1. Heat dissipating plate 13 is fixed to pedestals 144 of insulator 112 via three screws 301 inserted in screw holes 154. Accordingly, although heat dissipating plate 13 is in direct contact with insulator 112 at feet 152, heat dissipating plate 13 is not in direct contact with iron core 111, as illustrated in (a) in FIG. 4. Therefore, heat does not directly transfer from iron core 111 to heat dissipating plate 13. Moreover, although screws 301 are inserted in screw holes 154 formed through feet 152 and screw holes 135 formed in first surface 134 of insulator 112, the leading ends of screws 301 do not contact iron core 111. Therefore, heat does not directly transfer from iron core 111 to screws 301. Accordingly, the transfer of heat from iron core 111 to heat dissipating plate 13 via screws 301 is also inhibited.

Moreover, as illustrated in (a) in FIG. 4, the screw heads of screws 301 are sunken in screw head recesses 153, such that the tops of the screw heads do not protrude beyond first major surface of heat dissipating plate 13 in the axial direction. Accordingly, the size of motor 1 in the axial direction can be reduced.

(1-4. Circuit Board)

As illustrated in FIG. 1, when attached to heat dissipating plate 13, circuit board 14 is disposed between heat dissipating plate 13 and stator 11. More specifically, as illustrated in (a) in FIG. 4, circuit board 14 is fixed to first major surface 157 of heat dissipating plate 13 via screws 302.

As illustrated in (a) in FIG. 4, circuit board 14 includes board main body 161, switching element 167, rubber component 168, and sensors 169. Bypass port 171 for passing through shaft 101 is formed in the central region of board main body 161. Rubber component 168 is made of a thermally conductive rubber material, and is disposed on board main body 161, on the surface that faces heat dissipating plate 13.

Although circuit board 14 is not in direct contact with stator 11, circuit board 14 is in direct contact with heat dissipating plate 13. More specifically, as a result of screws 302 being fastened, rubber component 168 presses tightly against heat dissipating plate 13. Therefore, heat does not directly transfer from stator 11 to circuit board 14. On the other hand, heat generated in circuit board 14 is efficiently transferred to heat dissipating plate 13 and dissipated.

Three sensors 169 are provided evenly spaced apart along bypass port 171 on the surface of board main body 161 on the stator 11 side. Note that only two sensors 169 are illustrated in (a) in FIG. 4. Each sensor 169 is, for example, a Hall element. Switching element 167 is, for example, a thin-film transistor. Sensors 169 detect the location of the magnetic pole of rotor 12, and based on the detection result, switching element 167 switches the direction in which the field current supplied to coils 114 flows to make it possible to rotationally drive rotor 12.

(1-5. Housing)

Next, housing 2 will be described with reference to FIG. 1. Housing 2 is configured of two, left and right halves divided along the shaft axis: first half casing 21 and second half casing 22. First half first casing 21 and second half casing 22 are coupled by, for example, fasteners such as nuts and bolts, interlocking structures such as a hook and a recess that accommodates and interlocks with the hook, or an adhesive.

Since the internal structure of second half casing 22 is the same as first half first casing 21, detailed explanation and illustration thereof is omitted.

First half first casing 21 includes main body housing 201 and bearing housings 202 and 203.

Main body housing 201 houses stator 11. In a state in which stator 11 is housed, rotor 12 is housed in stator 11 so as to be axially aligned with stator 11, and heat dissipating plate 13 is attached to one end, in the axial direction, of stator 11. First half first casing 21 further includes through-hole 206. When stator 11 is housed in main body housing 201, a portion of circuit board 14, which attached to heat dissipating plate 13, protrudes out of housing 2 from through-hole 206.

Moreover, in a state in which stator 11 is housed in main body housing 201, groove 127 in outer circumferential surface 136 of insulator 112 creates a gap between outer circumferential surface 136 of insulator 112 and the inner circumferential surface of first half first casing 21. Connection terminal 303 for supplying power to coils 114 is inserted in this gap and connected to coils 114.

Bearings 103 and 104 are housed in bearing housings 202 and 203 such that both ends of shaft 101 are rotatable.

Positioning protrusions 204 that extend in an arc shape and rotation stop protrusions 205 that extend in the axial direction are provided on the inner circumferential surface of first half first casing 21 in main body housing 201. Width W1 of positioning protrusions 204 in the axial direction is equal to width W2 of positioning recess 122 in the axial direction. Height H1 of positioning protrusions 204 is equal to depth D2 (see (b) in FIG. 2) of positioning recess 122. Moreover, the width and height of rotation stop protrusions 205 are equal to the width and depth of engagement grooves 125, respectively.

When placing stator 11 so as to be housed in main body housing 201, positioning protrusions 204 interlock with positioning recess 122 of stator 11. In other words, positioning protrusions 204 of first half first casing 21 and positioning recess 122 of stator 11 interlock in a gapless manner. This determines the position of stator 11 in the axial direction relative to first half first casing 21. In other words, this determines the position of stator 11 in the axial direction relative to housing 2. Further, indirectly, this determines the position of circuit board 14 in the axial direction relative to housing 2. Moreover, rotation stop protrusions 205 interlock with engagement grooves 125. This inhibits stator 11 from rotating relative to housing 2.

In FIG. 4, (b) illustrates an enlarged view of area in which positioning protrusions 204 of first half first casing 21 interlock with positioning recess 122 of stator 11, and corresponds to the area surrounded by the dotted-and-dashed line in the cross section in (a) in FIG. 4. As illustrated in (b) in FIG. 4, insulator 112 and iron core 111 are structured so as to sandwich positioning protrusions 204 of first half first casing 21. As such, the thickness of insulator 112 in the axial direction may be to a degree that ensures strength in the region from end surface 142 to first surface 134. As a result, the thickness of insulator 112 in the axial direction can be reduced, whereby the length of motor 1 itself in the axial direction can be reduced.

2. Variations (2-1. Variation 1)

In the embodiment, heat dissipating plate 13 is exemplified as being attached to insulator 112 such that feet 152 of heat dissipating plate 13 and pedestals 144 of insulator 112 are in contact. However, the present invention is not limited to this example.

For example, feet 152 may be omitted from heat dissipating plate 13 and heat dissipating plate 13 may be attached to insulator 112 such that heat dissipating plate main body 151 is in direct contact with pedestals 144 of insulator 112. Even with such a configuration, so long as pedestals 144 are sufficiently tall, space can be secured between heat dissipating plate 13 and stator 11 for disposing circuit board 14. Conversely, pedestals 144 may be omitted from insulator 112 and screw holes 135 may be provided directly on the first surface of annular ring 131 of insulator 112. Even with such a configuration, so long as feet 152 of heat dissipating plate 13 are sufficiently long, space can be secured between heat dissipating plate 13 and stator 11 for disposing circuit board 14.

(2-2. Variation 2)

In the embodiment, width W1 and height H1 of positioning protrusions 204 on first half first casing 21 are exemplified as being equal to width W2 and depth of positioning recess 122 in stator 11, respectively, but the present invention is not limited to this example. For example, the depth of positioning recess 122 may be less than height H1 of positioning protrusions 204. Even with such a configuration, positioning protrusions 204 on first half first casing 21 and positioning recess 122 in stator 11 can interlock with no backlash in the axial direction, whereby positioning of stator 11 and circuit board 14 in the axial direction can be determined.

Moreover, so long as positioning protrusions 204 and positioning recess 122 are shaped so as to interlock with no backlash in the axial direction, the structures of positioning protrusions 204 and positioning recess 122 are not limited to the examples given in the embodiment and variations 1 and 2. For example, positioning recess 122 may be an annular groove, and positioning protrusions 204 may have a width in the axial direction that is equal to the width of positioning recess 122 in the axial direction and may be protrusions shaped like comb teeth.

Note that the same applies to the relationship between rotation stop protrusions 205 and engagement grooves 125; so long as they have an interlocking structure with no backlash in the circumferential direction, the structures thereof are not limited to the examples given in the embodiment. For example, the height of each rotation stop protrusion 205 may be less than the depth of each engagement groove 125.

(2-3. Variation 3)

In the embodiment, the outer diameters of iron core 111 and insulator 112 are exemplified as being the same. However, the present invention is not limited to this example. For example, the outer diameter of insulator 112 may be smaller than the outer diameter of iron core 111. Even with such a configuration, since on insulator 112 the outer diameter of second outer circumferential surface 138 is smaller than the outer diameter of outer circumferential surface 136, positioning recess 122 can be formed. Note that if the outer diameter of insulator 112 is larger than the outer diameter of iron core 111, the size of main body housing 201 needs to be increased, resulting in an increase in the size of motor 1. As such, the outer diameter of insulator 112 is preferably smaller than the outer diameter of iron core 111.

Moreover, from the perspective of preventing an increase in the size of motor 1 due to an increase in the size of main body housing 201, the maximum width Wmax of heat dissipating plate 13 is preferably less than or equal to the outer diameter of annular ring 131.

(2-4. Variation 4)

In the embodiment, regarding stator 11 and housing 2, relative movement in the axial direction is exemplified as being restricted only by the interlocking of positioning protrusions 204 and positioning recess 122. However, the present invention is not limited to this example. For example, a dividing wall may be provided on the inner circumferential surface of first half first casing 21 that faces main body housing 201, in a location between insulator 113 and cooling fan 102. In this case, main body housing 201 is divided by the dividing wall into a fan housing section that houses cooling fan 102 and a stator housing section that houses stator 11 and rotor 12 excluding cooling fan 102. As such, movement of stator 11 toward cooling fan 102 can be restricted via the dividing wall. However, in order to avoid interference with the positioning determined by the interlocking of positioning recess 122 positioning protrusions 204, the dividing wall is preferably not rigidly fixed to stator 11 and not a structure that would apply compressive stress to stator 11 in the axial direction. This is because stress will be applied to the interlocking location of positioning recess 122 and positioning protrusions 204 due to, for example, margins of error in the length of iron core 111 in the axial direction and the thermal expansion of iron core 111, causing a reduction in the precision of the positioning. Note that the configuration for restricting movement of stator 11 is not limited to a dividing wall; for example, a component that holds insulator 113 may be employed.

(2-5. Variation 5)

In the embodiment, circuit board 14 is exemplified as being attached to a side opposite the cooling fan 102 side from the perspective of stator 11, and shaft 101 is exemplified as protruding out from housing 2 on the cooling fan 102 side. However, the present invention is not limited to this example. For example, cooling fan 102 may be attached to the same side as circuit board 14 from the perspective of stator 11, and shaft 101 may protrude out from housing 2 on the circuit board 14 side. Moreover, cooling fans 102 may be attached to both sides of stator 11, and, alternatively, motor 1 need not include a fan.

(2-6. Variation 6)

In the embodiment, motor 1 is exemplified as including a unique housing 2. However, the present invention is not limited to this example. For example, when motor 1 according to the embodiment is applied as an electric power source for an electric tool such as an impact driver, motor 1 according to the embodiment may be incorporated as a part in the electric tool. Moreover, a portion of the housing of the electric tool may double as housing 2 for motor 1. In such a case, a portion of the housing of the electric tool may be a motor housing, and elements included in motor 1 excluding housing 2 may be incorporated in the motor housing. When a portion of the housing of the electric tool is a motor housing, the positioning protrusion may be provided on the inner circumferential surface of the motor housing in the housing of the electric tool.

(2-7. Variation 7)

In the embodiment, stator 11 is exemplified as including six coils 114 and rotor 12 is exemplified as including a tetrapolar permanent magnet 106. However, the present invention is not limited to this example. For example, stator 11 may include eight or ten coils 114. In such a case, iron core 111 includes the same number of teeth 124 as there are coils 114, and insulator 112 includes the same number of teeth covers 133 as there are coils 114. Moreover, rotor 12 may include a bipolar or tripolar permanent magnet 106.

Moreover, motor 1 is not limited to a brushless DC motor; motor 1 may be an any given inner rotor synchronous motor including a sensor that detects the angle of the rotor and an electromagnet stator, such as, for example, a stepping motor or servo motor.

3. Summary

As described above, motor 1 according to the embodiment includes: stator 11; rotor 12 axially aligned with stator 11; circuit board 14 disposed at one end, in the axial direction, of stator 11, and having sensors 169 for detecting a rotational angle of rotor 12 and switching element 167 for controlling the flow of current based on a detection result of sensors 169; and heat dissipating plate 13 disposed at the one end, in the axial direction, of stator 11. Stator 11 includes: iron core 111 including cylinder 121 and teeth 124 protruding radially inward relative to cylinder 121; insulator 112 covering teeth 124 and one end surface, in the axial direction, of cylinder 121; and coils 114 wound around teeth 124 covered by insulator 112. Insulator 112 includes an electrically insulating material having a lower rate of heat transfer than a material included in iron core 111. Heat dissipating plate 13 is attached to insulator 112 in a state in which heat dissipating plate 13 is in contact with insulator 112 without being in contact with iron core 111. Circuit board 14 is attached to heat dissipating plate 13 in a state in which circuit board 14 is in contact with heat dissipating plate 13 without being in contact with iron core 111.

Since heat dissipating plate 13 is in contact with and attached to insulator 112, which is less thermally conductive than iron core 111, without being in contact with iron core 111, heat generated in coils 114 can be inhibited from being transferred from iron core 111 to heat dissipating plate 13. Accordingly, it is possible to inhibit the generation of transferred heat from heat dissipating plate 13 to circuit board 14 and thus improve the heat dissipation of switching element 167. Moreover, since circuit board 14 is attached to insulator 112 via heat dissipating plate 13, sensors 169 can be fixed to as to be stationary relative to stator 11. Therefore, in a configuration in which switching element 167 and sensors 169 are consolidated on the same circuit board 14, it is possible to both fix sensors 169 so as to be stationary relative to stator 11 and improve the heat dissipation of switching element 167.

Moreover, in a view along the axial direction, heat dissipating plate 13 is smaller in size than cylinder 121, and heat dissipating plate 13 is attached to insulator 112 in a location further radially inward than an outer circumferential surface of cylinder 121. This makes it possible to inhibit an increase in the size of housing 2 in the radial direction, and therefore facilitates a smaller motor 1.

Moreover, insulator 112 includes: annular ring 131 that covers the one end surface, in the axial direction, of cylinder 121; and teeth covers 133 spaced apart on annular ring 131 in a circumferential direction and covering teeth 124. The location in which heat dissipating plate 13 is attached to insulator 112 is between two pairs of adjacent teeth covers 133 among teeth covers 133 on annular ring 131. This makes it possible to avoid interference between the attachment location of insulator 112 on annular ring 131 and coils 114, in a state in which coils 114 are wound around teeth 124 covered by teeth covers 133.

Moreover, a portion, of heat dissipating plate 13, contacting annular ring 131, and a portion, of annular ring 131, contacting heat dissipating plate 13 have an interlocking structure. Positioning of heat dissipating plate 13 in the circumferential direction of stator 11 is determined by the interlocking structure interlocking. This structure simplifies the positioning of heat dissipating plate 13 relative to insulator 112, making assembly of motor 1 easier.

Moreover, screw holes 135 compatible with screws 301 for fastening heat dissipating plate 13 are formed in annular ring 131, on a surface on a side opposite a side adjacent to the one end surface, in the axial direction, of cylinder 121. Heat dissipating plate 13 includes: first major surface 157 that faces stator 11; and second major surface 156 on an opposite side relative to first major surface 157. Recess 153 is formed in second major surface 156, screw holes 154 are formed in a bottom surface of recess 153 and penetrate through heat dissipating plate 13. Heat dissipating plate 13 and insulator 112 are fixed together by screws 301 being inserted in both screw holes 154 formed in recess 153 and screw holes 135 formed in annular ring 131. Screw heads of screws 301 do not protrude beyond second major surface 156 in the axial direction in a state in which screws 301 are screwed down. This makes it possible to inhibit an increase in the size of motor 1 in the axial direction, and therefore facilitates a smaller motor 1.

Moreover, motor 1 further includes housing 2 that houses stator 11. Protrusions 204 are formed on an inner circumferential surface of housing 2. Recess 122 is formed on outer circumferential surface 123 of stator 11. Positioning of stator 11 relative to housing 2 is determined by recess 122 and protrusions 204 interlocking. Insulator 112 includes annular ring 131 in close contact with cylinder end surface 126 of the one end, in the axial direction, of cylinder 121. Recess 122 in stator 11 is formed by forming notch 141 in a portion of outer circumferential surface 136 of annular ring 131, in an area including a portion in close contact with cylinder end surface 126. With this, insulator 112 and iron core 111 have a structure that sandwiches protrusions 204 of housing 2. With such a structure, since the strength of insulator 112 can be ensured in the axial direction, only the thickness from notch 141 to first surface 134 needs to be taken into consideration. As a result, the length of motor 1 in the axial direction can be reduced.

Moreover, groove 127 extending in the axial direction is formed in outer circumferential surface 136 of annular ring 131. In a state in which stator 11 is housed in housing 2, groove 127 creates a gap between housing 2 and outer circumferential surface 136 of annular ring 131, and connection terminal 303 for supplying power to coils 114 is inserted in the gap. With this, there is no need to dispose connection terminal 303 further outward than the outer circumference of annular ring 131, and it possible to inhibit an increase in the size of motor 1 in the radial direction which facilitates a smaller motor 1.

Moreover, in an electric tool including motor 1 described above, since motor 1 excels in dissipating the heat in switching element 167, it possible to improve operation stability with respect to heat generation.

Note that the motor according to the present invention is applicable as a motor used as an electric power source for an electric tool.

Although the present invention has been described based on an embodiment and variations 1 through 7, the present invention is not limited to the embodiment and variations. Those skilled in the art will readily appreciate that many modifications are possible in the embodiment and variations without materially departing from the spirit of the present invention. Accordingly, all such modifications are intended to be included within the scope of the present invention.

The invention claimed is:

1. A motor comprising:
a stator;
a rotor axially aligned with the stator;
a circuit board disposed at one end, in an axial direction, of the stator, and having a sensor for detecting a rotational angle of the rotor and a switching element for controlling a flow of current based on a detection result of the sensor; and
a heat dissipating plate disposed at the one end, in the axial direction, of the stator,
wherein the stator includes:
an iron core including a cylinder and teeth protruding radially inward relative to the cylinder;
an insulator covering the teeth and one end surface, in the axial direction, of the cylinder; and
a coil wound around the teeth covered by the insulator,
the insulator includes an electrically insulating material having a lower rate of heat transfer than a material included in the iron core,
the heat dissipating plate is attached to the insulator in a state in which the heat dissipating plate is in contact with the insulator without being in contact with the iron core, and
the circuit board is attached to the heat dissipating plate in a state in which the circuit board is in contact with the heat dissipating plate without being in contact with the iron core, and
wherein in a view along the axial direction, the heat dissipating plate is smaller in size than the cylinder, and
the heat dissipating plate is attached to the insulator in a location further radially inward than an outer circumferential surface of the cylinder.

2. The motor according to claim 1, wherein
the insulator includes:
an annular ring that covers the one end surface, in the axial direction, of the cylinder; and
teeth covers spaced apart on the annular ring in a circumferential direction and covering the teeth, and
the location in which the heat dissipating plate is attached to the insulator is between two pairs of adjacent teeth covers among the teeth covers on the annular ring.

3. The motor according to claim 2, wherein
a portion, of the heat dissipating plate, contacting the annular ring, and a portion, of the annular ring, contacting the heat dissipating plate have an interlocking structure, and
positioning of the heat dissipating plate in the circumferential direction of the stator is determined by the interlocking structure interlocking.

4. The motor according to claim 2, wherein
a screw hole compatible with a screw for fastening the heat dissipating plate is formed in the annular ring, on a surface on a side opposite a side adjacent to the one end surface, in the axial direction, of the cylinder,
the heat dissipating plate includes:
a first major surface that faces the stator; and
a second major surface on an opposite side relative to the first major surface,
a recess is formed in the second major surface,
a screw hole is formed in a bottom surface of the recess and penetrates through the heat dissipating plate,
the heat dissipating plate and the insulator are fixed together by the screw being inserted in both the screw hole formed in the recess and the screw hole formed in the annular ring, and
a screw head of the screw does not protrude beyond the second major surface in the axial direction in a state in which the screw is screwed down.

5. The motor according to claim 1, further comprising
a housing that houses the stator,
wherein a protrusion is formed on an inner circumferential surface of the housing, a recess is formed on an outer circumferential surface of the stator, and positioning of the stator relative to the housing is determined by the recess and the protrusion interlocking,
the insulator includes an annular ring in close contact with a cylinder end surface of the one end, in the axial direction, of the cylinder, and
the recess in the stator is formed by forming a notch in a portion of an outer circumferential surface of the annular ring, in an area including a portion in close contact with the cylinder end surface.

6. The motor according to claim 5, wherein
a groove extending in the axial direction is formed in the outer circumferential surface of the annular ring, and
in a state in which the stator is housed in the housing, the groove creates a gap between the housing and the outer circumferential surface of the annular ring, and a connection terminal for supplying power to the coil is inserted in the gap.

7. An electric tool, comprising the motor according to claim 1.

* * * * *